Sept. 8, 1931.   H. FELDMEIER   1,821,934
HEAT INTERCHANGER
Filed Dec. 27, 1926
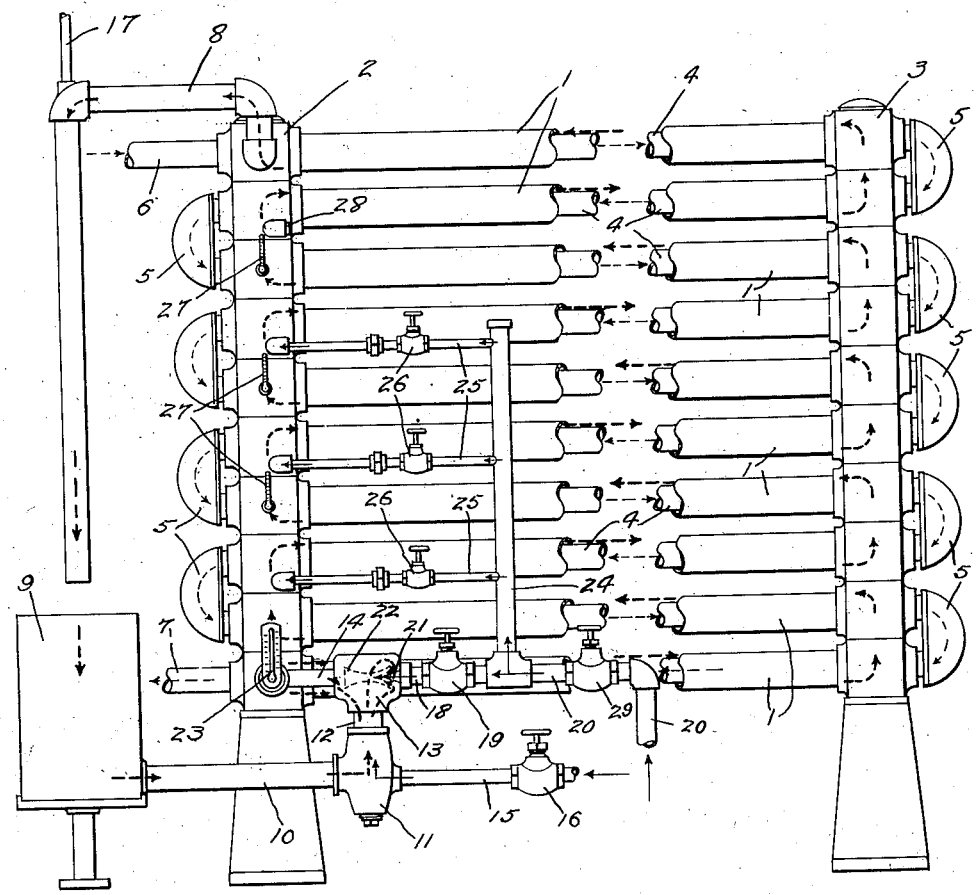
INVENTOR.
Harvey Feldmeier
by Parker & Prochnow
ATTORNEYS.

Patented Sept. 8, 1931

1,821,934

UNITED STATES PATENT OFFICE

HARVEY FELDMEIER, OF LITTLE FALLS, NEW YORK, ASSIGNOR, BY MESNE ASSIGNMENTS, TO CHERRY-BURRELL CORPORATION, OF WILMINGTON, DELAWARE, A CORPORATION OF DELAWARE

HEAT INTERCHANGER

Application filed December 27, 1926. Serial No. 157,126.

This invention relates to heat interchangers, and particularly to such interchangers which are adaptable for the pasteurization of milk. In the heating of milk or cream to pasteurize it, during which the temperature of the milk or cream is raised to and maintained for a desired interval at a suitable temperature, which may, for example, be from 142° to 145° F. for milk and from 165° to 185° F. for cream, the milk or cream is commonly circulated and subjected to heat interchange with a quantity of hot circulating water. The temperature of the water should preferably not greatly exceed the desired temperature to which the milk or cream is to be raised, because if the water temperature is too high, there is danger that some of the milk particles may be overheated or scorched, which may change some of their physical properties, such as taste and viscosity, due to coagulation of the albumen, or ability of the cream to rise. The transmission of the heat from the water to the milk is due to the difference in temperature between the milk and water, and therefore the higher that the water temperature can be maintained throughout its course without overheating or injury to the milk, the greater the average temperature difference will be, and therefore the more rapidly the milk can be heated.

An object of the invention is to provide an improved heat interchange method and apparatus, with which substances such as milk may be rapidly and efficiently heated without danger of overheating; with which the heat interchange may be continuously carried on; and which will be relatively simple and inexpensive.

Various other objects and advantages will be apparent from the following description of an embodiment of the invention, and the novel features will be particularly pointed out hereinafter in connection with the appended claims.

The accompanying drawing illustrates a heat interchanger for the pasteurization of milk, constructed in accordance with this invention.

In the illustrated embodiment of the invention, a series of stretches of pipe 1 extend back and forth between two columns of superposed heads 2 and 3, and the heads at each end of the group of stretches of pipe 1 will communicate in series with one another, alternately at opposite ends of the stretches, so as to form of the pipes a continuous zig-zag conduit or passage. Within each stretch of pipe 1 is a smaller pipe 4, which is in spaced relation to the walls of the outer pipe 1 and extends through the heads 2 and 3 at each end. The extending ends are connected alternately in series by suitable connectors 5, so that the inner pipes will all be connected in series. Thus there are two separate passages largely one within the other, and therefore in heat interchanging relation to one another.

The ends of one of the passages, such as the inner passage formed by the pipes 4, is provided at its ends with connector pipes 6 and 7 which lead to a suitable source of milk and a circulating device (not shown) so that the milk to be heated may be circulated as in a stream through the inner passage. A pipe 8 is connected to one end of the other passage, such as through one of the upper or end headers 2, and extends laterally therefrom and then downwardly terminating just above an open receptacle or tank 9. This tank 9 is connected by a pipe 10 to an injector 11, and the latter is connected by a pipe 12 to a mixing valve 13, the latter in turn being connected, by pipe 14, to the other end of the outer passage through another header 2.

The injector 11 is supplied with steam by a suitable steam supply pipe 15 controlled by a regulating valve 16. Thus when steam is admitted to the injector through pipe 15, the water from the tank 9 will be drawn out through the pipe 10 and circulated successively through the spaces between the inner and outer pipes and then returned to the tank 9 through the pipe 8. The pipe 8 may have a vent 17 at its highest point so as to prevent syphoning of the water from the heater into the tank 9.

While the water drawn from the tank 9 will be heated somewhat by the injector by which it is circulated, it is usually desirable to add additional heat. Accordingly, the mixing valve 13 interposed between the injector and the inlet end of the water passage of the pipes is provided with a branch steam supply pipe 18 controlled by a valve 19 and connected to a main steam supply pipe 20. The latter is also provided with a main regulating valve 29 and may be connected to a source of steam through a suitable automatic regulating device responsive to the changes in temperature in the circulating water. The steam from the pipe 18 may be admitted to the mixing chamber through a suitable nozzle 21, and the nozzle discharges into one end of a mixing shell 22 disposed in the mixing valve casing.

This mixing shell is tubular and somewhat spool-shaped, in that it has a passage which converges from each end to a restricted passage section intermediate of its ends, and the nozzle 21 discharges steam endwise into one of the flared ends of the shell in spaced relation to the wall of the shell at that end. The steam entering in this manner as a jet will draw a portion of the water in the mixing valve casing with it, and be mixed therewith before being mixed with other of the circulating water as with the water in the remainder of the casing and in the pipe 14 leading to one end of the heat interchanger formed by the inner and outer pipes. By regulating the valve 19, the amount of steam admitted may be varied and thus the temperature of the ingoing hot water may be predetermined. A thermally responsive element 23 may be disposed in the pipe 14 as it enters one end of the outer passage of the heat interchanger, so as to indicate the temperature of the ingoing hot water.

Inasmuch as the hot water will be cooled after it travels through the heat interchanger, the difference in temperature between the milk and water will become less as the circulation continues, and therefore the heat transfer will be greatly decreased. It is undesirable to give the ingoing hot water a temperature materially above 150° F., as otherwise the particles of the milk might be overheated and its properties undesirably altered. Accordingly, I have discovered that this difficulty may be overcome by admitting additional quantities of steam to the circulating hot water at spaced points in its travel, through the heat interchanger, so that the circulating water may have throughout its travel through the interchanger the desired temperature which will not injure the milk, but will provide the maximum possible rate of heat interchange between the water and milk, and this temperature may be maintained throughout the desired portion of the circulation by means of the additionally admitted steam. Accordingly, a branch pipe 24 extends from the pipe 20, and is in turn provided with branches 25 which have therein separate regulating valves 26 and connect to headers 2 at spaced points along the travel of the hot water.

By selectively varying the opening of the valves 26, the temperature of the hot circulating water may be maintained. In order that the temperature of the hot water at various stages of its circulation through the heat interchanger may be known as a guide in the proper regulation of the valves 26, I may provide additional thermometers or temperature indicating devices 27 at selected points in the travel of the hot water through the heat interchanger, such as at the elbows at points just preceding the steam inlets from the pipes 25. Thus the indicated temperatures of the hot circulating water at the various points where the hot water approaches the branch steam inlet will serve as guides to an attendant in regulating the valves 26.

The hot water and milk will preferably, as is commonly the case, circulate in opposite directions and therefore a few stretches of the double pipes at one end of the double passage are left unconnected to the branch steam inlet, so that the hot water may be cooled slightly by the ingoing cold milk just prior to the emergence of the hot water from the heat interchanger. This is particularly desirable where the water is circulated by the injector, because the water must be cooled somewhat in order to be circulated by the injector. It will be understood, however, that a mechanical pump may be substituted for the injector within the principle of the invention, and when so substituted, it is possible, and in some cases desirable, to extend the branch steam inlets to the hot circulating water practically throughout the entire length of the path of circulation of the water through the heat interchanger, any unused openings for the auxiliary jets being closed by plugs 28.

The valves 19 and 26 have been illustrated as manually operated for the purposes of simplicity, but it will be understood that these valves or the others may be automatically regulated by instruments responsive to the temperature of the circulating water if desired, such automatic thermo-regulators being well known in the art. The main branch supply pipe 20 may have a main controlling valve 29 if desired.

It has been found that with this improved heat interchanger, a much higher average and more uniform water temperature may be obtained than by previous heaters, and a more rapid and efficient heat interchange between the hot water and the milk obtained. By using the branch steam inlets at points along the travel of the water in the heat interchange, the capacity of a given heat interchanger is practically doubled without danger of overheating or injuring the milk. The steam inlets are preferably at the heads 21 which are sufficiently large to allow mixture of the steam and water before close contact with the milk tube is obtained, otherwise, if the steam were injected directly against the inner or milk tube, the milk in contact with the tubes at the points struck by the steam jets would be unduly heated and injured.

It will be obvious that various changes in the details which have been herein described and illustrated in order to explain the invention may be made by those skilled in the art within the principle and scope of the invention as expressed in the appended claims.

I claim as my invention:—

1. A heat interchanger comprising a conduit having a plurality of stretches of tubes connected in series and draining by gravity towards one end of the series, each tube having therein a smaller tube in spaced relation to its walls, the smaller tubes being also connected in series, whereby separate fluids may be circulated through the inner and outer tubes, inlet and outlet connections to the upper and lower ends respectively of one of said tubes for circulating downwardly therethrough a fluid to be treated, means for circulating a heat transfer fluid upwardly through the other of said tubes, and means for admitting to said heat transfer fluid, at a selected point in its circulation through said tubes, further heat transfer fluid so as to obtain the desired temperature of the said circulating heat transfer fluid in different stretches of the tubes.

2. A heat interchanger comprising a conduit having a plurality of stretches of tubes connected in series, each tube having therein a smaller tube in spaced relation to its walls, the smaller tubes being also connected in series whereby separate fluids may be circulated through the inner and outer tubes, inlet and outlet connections to one of said tubes for circulating therethrough a fluid to be treated, means for circulating a hot liquid through the other of said tubes and keeping that tube filled with said liquid, and a supply conduit having branch connections to selected stretches of said other of the tubes for admitting steam to the hot liquid at spaced points in its circulation through the tubes, whereby the desired temperature of the circulating hot liquid may be obtained in different stretches of the tubes.

3. A heat interchanger comprising a conduit having separate passages one contained within and spaced from the other, connections by which a fluid to be treated may be circulated through one of the passages, a reservoir, means including an injector for withdrawing liquid from said reservoir and forcing it into the other of said passages through one end thereof, an overflow pipe connected to the other end of said other of the passages for returning the liquid to the reservoir, and means for supplying steam to said liquid at a plurality of points in the said other of the passages spaced apart in the direction of flow of said liquid whereby the desired temperature of said liquid may be obtained at various points in the circulation of said liquid.

4. A device for heating milk comprising separate passages in heat interchanging relation to one another, connections by which milk may be circulated through one of said passages for treatment, means including connections to the other of said passages for circulating a hot liquid therethrough and keeping that passage completely filled with the liquid, and means for admitting steam to said other of the passages at points spaced apart in the direction of flow of said hot liquid, for maintaining desired temperatures of said hot liquid throughout a desired portion of its circuit.

5. In a device for heating milk, a pair of separate passages running in heat interchanging relation to one another, connections by which the milk to be treated may be circulated through one of the passages, means including an injector for circulating a supply of hot water through the other of said passages and in the opposite direction to the milk circulation to cause a heating of the milk, and auxiliary means for supplying additional heat to the water while in said passage, but at a material distance from the exit end of the water passage, whereby the water may be maintained at desired temperatures during a desired portion of its travel in heat interchanging relation to the milk, and then allowed to cool by heat interchange with the ingoing milk during the final portion of travel of the water in heat interchanging relation with the milk so as to lower its temperature to an extent that the injector will handle it for recirculation.

6. In a device for heating milk, a pair of separate passages running in heat interchanging relation to one another, connections by which the milk to be treated may be circulated through one of said passages, means including an injector for circulating hot water through the other of said passages to cause a heating of the milk, and auxiliary means for admitting steam to the water conducting passage at a point spaced from the injector for offsetting the fall of temperature of the circulating water due to its loss of heat to the milk.

7. A device for heating milk comprising a pair of separate passages in heat interchanging relation to one another, connections by which a quantity of milk to be treated may be circulated through one of the passages, means including an injector for circulating a supply of hot water through the other of said passages to cause a heating of the milk, and auxiliary means for supplying additional heat to the water while in said passage, but at a material distance from the exit end of the water passage, whereby the water may be maintained at any desired temperature during a desired portion of its travel in heat interchanging relation to the milk, and then allowed to cool by heat interchange with the milk during the final portion of its travel in heat interchanging relation so as to lower its temperature to such an extent that the injector will handle it for recirculation.

8. The method of effecting a heat interchange with a fluid such as milk which comprises conducting a treating liquid and a fluid to be treated through separate passages in heat interchanging relation to one another, and with the liquid completely filling its passage, and admitting to said treating liquid at a plurality of points spaced along its path of travel while in heat interchanging relation to the other fluid, a fluid medium which modifies the heat interchanging properties of the treating liquid, whereby the treating liquid may be given a desired temperature at different points in its travel while in said relation to the said fluid to be treated.

9. The method of heating milk which comprises conducting the milk and hot water in separate streams in heat interchanging relation to one another, and admitting steam to the water at points spaced apart in the travel of the water while in heat interchanging relation to the milk in an amount sufficient to maintain a desired uniform temperature in the milk stream.

10. The method of effecting a heat exchange with a fluid such as milk to be treated, which comprises circulating, in heat exchanging relation to said fluid, a treating liquid in an ascending confined column, and adding steam to said ascending column at different points along the same to create and maintain desired temperatures in various sections along the column.

11. The method of effecting a heat exchange with milk or the like to be treated which comprises circulating a liquid through a conduit which it fills, passing said milk in heat exchanging relation to said conduit, and adding steam to said liquid at spaced points in its path of flow, to create and maintain desired temperatures of said liquid in various sections of its travel along said path.

12. The method of effecting a heat exchange with a fluid such as milk to be treated, which comprises circulating a liquid through a conduit which it fills, passing said fluid in heat exchanging relation to said conduit, and adding a temperature modifying fluid to said liquid at spaced points in its path of flow, to create and maintain desired temperatures in various sections of said liquid along said path.

13. The method of effecting a heat exchange with a fluid to be treated such as milk which comprises circulating a liquid in an ascending column, circulating said fluid in a descending column along and in heat exchanging relation to said ascending column, and adding a temperature modifying fluid to said ascending column at selected points spaced along that column in the direction of its flow, to create and maintain desired temperatures in the various sections of the liquid column along its path of flow.

14. A device for heating a fluid comprising two conduits in heat exchanging relation to one another and each draining by gravity towards one end, means connected to one of said conduits for circulating a liquid upwardly therethrough, means connected to the other conduit for circulating a fluid to be treated downwardly therethrough, and means for supplying steam to the ascending column of liquid at a plurality of points spaced apart along the path of flow of said liquid, whereby the said liquid may be raised to and maintained at desired temperatures while ascending in heat exchanging relation to said fluid.

15. A device for heating a fluid comprising two conduits, in heat exchanging relation to one another and each draining by gravity toward one end, means, including a steam injector, connected to one of said conduits for circulating a liquid in a closed circuit upwardly therethrough, means connected to the other conduit for circulating a fluid to be treated downwardly therethrough, and means for supplying steam to said liquid at a plurality of different points, spaced apart along the path of flow of said liquid in its said conduit, but spaced materially from the upper end of said conduit for the liquid, whereby the liquid may be maintained at desired temperatures during a desired portion of its travel in heat interchanging relation to the said fluid, and then allowed to cool by heat exchange with the ingoing fluid during the remaining portion of its travel in said relation.

16. A device for heating a fluid comprising two conduits in heat exchanging relation to one another, means connected to the ends of one of said conduits for circulating a liquid therethrough repeatedly in a closed circuit, means for circulating a fluid to be treated through the other of said conduits, and means for admitting steam to the circulating liquid at a point intermediate the ends of said conduit through which said liquid circulates, to maintain the temperature of the said liquid above a desired minimum for a considerable portion of its flow in its conduit.

17. The method of heating milk by a hot liquid which comprises circulating a liquid as a stream in a closed circuit, conducting the milk as a stream in heat exchanging relation to said liquid stream during a portion of the path of flow of said liquid, and injecting steam into the liquid stream at a plurality of points along its flow into heat exchanging relation with the milk, to maintain a desired temperature difference between said liquid and said milk at various points while in heat exchanging relation to one another.

18. A heat interchanger for fluids such as milk, comprising two conduits in heat interchanging relation to each other, means for circulating a fluid to be treated through one of said conduits, means for maintaining the other conduit full of a moving body of a treating liquid, and means for admitting a temperature changing fluid to the body of said treating liquid at points spaced apart in its travel in its conduit in heat interchanging relation, whereby the desired temperatures of the said treating liquid at desired points in its conduit may be obtained.

19. Apparatus for the heat treatment of milk and similar liquids, which comprises means for passing said milk and a treating fluid in separate streams in heat exchanging relation to one another, and means for heating the stream of said treating fluid at a plurality of different points along the travel of that stream in heat exchanging relation to said milk, whereby said stream of treating fluid may be maintained within a desired temperature range throughout its heat exchanging relation to said milk.

20. Apparatus for the heat treatment of milk and similar liquids which comprises a pipe system for passing a treating liquid, as a stream in a prescribed path, means for passing said milk in heat exchanging relation to said pipe system, and means for adding steam to said treating liquid at a plurality of points in said system, one of which is in between and not at the beginning and end of the travel of said treating liquid in heat exchanging relation to said milk, whereby fall of temperature of the treating liquid during its travel in heat exchanging relation to said milk will be retarded.

HARVEY FELDMEIER.